United States Patent
Varshovi

(10) Patent No.: US 11,332,415 B2
(45) Date of Patent: *May 17, 2022

(54) COATED ORGANIC MATERIALS AND METHODS FOR FORMING THE COATED ORGANIC MATERIALS

(71) Applicant: GreenTechnologies, LLC, Gainesville, FL (US)

(72) Inventor: Allan Amir Varshovi, Gainesville, FL (US)

(73) Assignee: GreenTechnologies, LLC, Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,659

(22) Filed: Jul. 22, 2019

(65) Prior Publication Data

US 2020/0157016 A1    May 21, 2020

Related U.S. Application Data

(63) Continuation of application No. 15/816,684, filed on Nov. 17, 2017, now Pat. No. 10,384,984.

(51) Int. Cl.
*C05G 5/30* (2020.01)
*C05F 11/00* (2006.01)
(Continued)

(52) U.S. Cl.
CPC ............... *C05G 5/30* (2020.02); *C05C 3/005* (2013.01); *C05C 5/04* (2013.01); *C05C 7/02* (2013.01);
(Continued)

(58) Field of Classification Search
CPC ... C05G 5/30; C05F 11/00; C05F 9/04; C05F 3/00; C05F 11/02; C05C 7/02;
(Continued)

(56) References Cited

U.S. PATENT DOCUMENTS

| 3,708,276 | A | ‡ | 1/1973 | Hecht et al. | C05G 5/37 71/27 |
| 4,026,696 | A | ‡ | 5/1977 | Young | C05C 1/00 71/28 |
| 5,749,936 | A | * | 5/1998 | Humphries | B01J 2/00 71/64.05 |

(Continued)

FOREIGN PATENT DOCUMENTS

| CN | 106316638 A | * | 1/2017 |
| CN | 107245001 A | ‡ | 10/2017 |
| JP | 55009683 A | ‡ | 1/1980 |

OTHER PUBLICATIONS

Incitec Pivot Fertilisers. "Product Density and Sizing" <https://www.incitecpivotfertilisers.com.au/~/media/Files/IPF/Documents/Fact%20Sheets/2016_DensityChart.pdf> Jul. 2016 (Year: 2016).*

*Primary Examiner* — Jennifer A Smith
(74) *Attorney, Agent, or Firm* — Law Office of John K. Pike, PLLC

(57) ABSTRACT

A composition and method for producing an organic material with an inorganic coating. The inorganic coating may include ammonium sulfate. The present disclosure also provides a fertilizer having an inorganic coating. A method according to the present disclosure includes granulating an organic material and coating the organic material with a reactive coating composition. The inorganic coating material may be generated in situ to the process of coating the organic material.

10 Claims, 2 Drawing Sheets

(51) Int. Cl.
*C05F 9/04* (2006.01)
*C05F 3/00* (2006.01)
*C05F 11/02* (2006.01)
*C05C 7/02* (2006.01)
*C05C 3/00* (2006.01)
*C05C 5/04* (2006.01)
*C05D 1/00* (2006.01)
*C05D 5/00* (2006.01)

(52) U.S. Cl.
CPC ............... *C05D 1/005* (2013.01); *C05D 5/00* (2013.01); *C05F 3/00* (2013.01); *C05F 9/04* (2013.01); *C05F 11/00* (2013.01); *C05F 11/02* (2013.01)

(58) Field of Classification Search
CPC ........... C05C 3/005; C05C 5/04; C05D 1/005; C05D 5/00; Y02P 20/145; Y02A 40/20
See application file for complete search history.

(56) References Cited

U.S. PATENT DOCUMENTS

| | | | | |
|---|---|---|---|---|
| 7,637,229 | B2* | 12/2009 | Hurwitz | A01K 1/0152 119/171 |
| 10,384,984 | B2* | 8/2019 | Varshovi | C05C 7/02 |
| 2004/0237615 | A1* | 12/2004 | Green | C05D 9/02 71/28 |
| 2008/0016765 | A1* | 1/2008 | Hartmann | C05B 7/00 47/58.1 SC |

* cited by examiner
‡ imported from a related application

COATED ORGANIC MATERIALS AND METHODS FOR FORMING THE COATED ORGANIC MATERIALS

FIELD OF THE DISCLOSURE

The present disclosure relates to a composition and method of making fertilizer. More specifically, the present invention includes a composition and method for producing an organic fertilizer with an inorganic coating. The present disclosure further related to a fertilizer composition including an inorganic coating and method of making same.

BACKGROUND OF THE DISCLOSURE

Continuous use of chemical pesticides and soluble fertilizers on urban landscape plants, bushes, and trees, and especially in agricultural settings in the production of crops, has created a variety of ecological problems. As the world and national populations have increased, farmers and horticulturalists have come to rely increasingly on chemically synthesized fertilizers and chemical pesticides to maintain an appropriate level of crop production to feed the growing population.

More and more organic base byproducts, including, but not limited to, biosolids, activated sludge, municipal compost, animal manures (such as, cow, horse, pig, sheep, or chicken manure, and the like), and composted organic byproducts containing various plant nutrients, are being produced as a result of industrial and agricultural activities and processes. The nutrient content of these byproducts is generally low and these byproducts have been used as fillers, soil amendments, or landfill because of their low commercial value.

Cultivated plants require significant amounts of nitrogen fertilization during the growing season to maintain a desirable production, size, and color. Various inorganic nitrogen fertilizer materials are available that can supply adequate amount of nitrogen for cultivation. However, these inorganic salts are highly soluble in the soil and are readily converted to nitrates that leach before there is sufficient absorption by the plants. Consequently, these inorganic nitrogen fertilizers are required to be applied frequently.

Natural and synthetic slow-release organic nitrogen materials are also available, which release nitrogen over a longer period of time, thus reducing the frequency of application while increasing the uniformity of plant growth and appearance. However, the natural and synthetic slow-release nitrogen sources are influenced differently by various environmental factors to which they are exposed, and therefore lack effectiveness. In addition, organic materials, such as fertilizers, constitute a fire hazard and are subject to auto-combustion when not stored safely. Further, the organic materials may be a nuisance due to unpleasant odors produced by decomposition.

Thus, there is a need for a composition and method for producing fertilizer that is safer to store and has less odor.

SUMMARY OF THE DISCLOSURE

Accordingly, the present invention provides a composition and method for producing granules of organic material with a coating of inorganic material. The granules with inorganic coating resist auto-combustion and provide more favorable handling conditions. In some embodiments, the subject invention provides a homogenous organic-based fertilizer coated with an inorganic coating. The homogenous organic-based fertilizer is used for plant nutrition and soil fertility. Also provided by the subject invention are fertilizer products with a greatly reduced propensity to combustion. Methods according to the invention involve the application of one or more organic compound(s), one or more penetrate(s), and one or more optional supplement(s) into one or more organic base material(s), and coating the resultant material with an inorganic material. The methods may result in new products with one or both of: increased nutrients and increased bulk density.

The subject invention may further provide fertilizer products having increased nutrient content and uptake efficiency. The fertilizer products may also have reduced odor associated with organic materials. The composition and method of the subject invention may also improve chemical, physical and agronomic value of the resultant fertilizer products.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
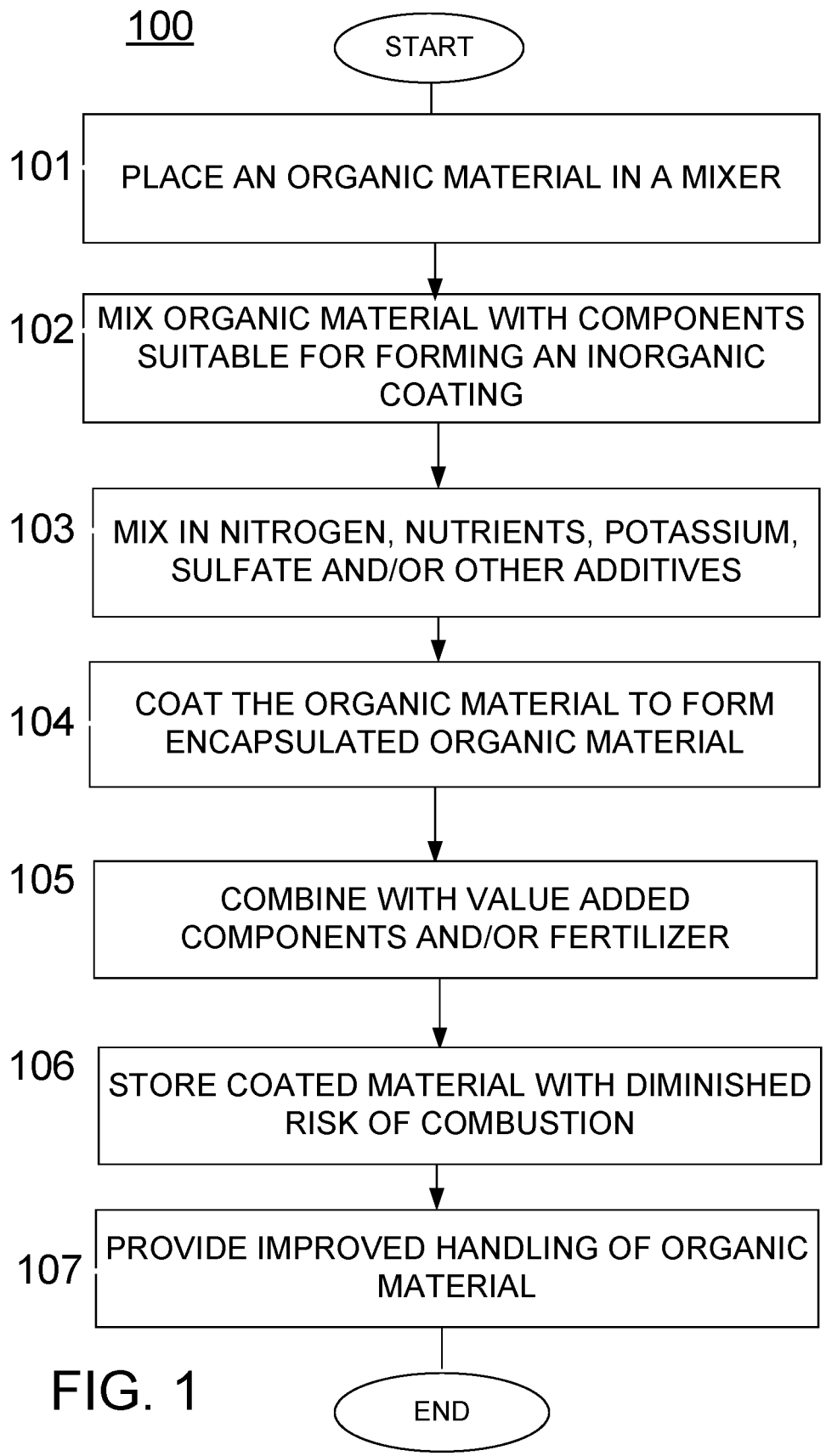
FIG. 1 illustrates a method of producing a fertilizer.

The present disclosure relates to a composition and method for coating an organic material with in inorganic material. Typically, inorganic materials are used to coat a soluble material, the present invention provides for coating insoluble organic material with an inorganic coating. More specifically, embodiments of the present invention include method to form an organic agronomic fertilizer with an inorganic coating and a resulting composition. The inorganic coating may include, for example, ammonium sulfate. The coating may increase the overall density and nitrogen content of the fertilizer. The coating may also prevent spontaneous combustion of the organic material of the fertilizer. The present disclosure is further related to a fertilizer product including the inorganic coating.

In the following sections, detailed descriptions of examples and methods of the disclosure will be given. The description of both preferred and alternative examples though are exemplary only, and it is understood that to those skilled in the art that variations, modifications, and alterations may be apparent. It is therefore to be understood that the examples do not limit the broadness of the aspects of the underlying disclosure as defined by the claims.

The present disclosure provides a composition and method for simultaneous coating and granulation of chemical fertilizers and/or organic materials using fine particles, a solution and/or a slurry comprising of ammonium sulfate, potassium sulfate, potassium magnesium sulfate, potassium chloride, magnesium sulfate, calcium nitrate and/or calcium ammonium nitrate. In some embodiments, a coating may be a reactive mineral layer coating. A reactive mineral layer coating may be formed, for example, a coating that takes place in situ based upon a combination of multiple components with an organic material. The combination allows for an inorganic material to form and coat the organic material.

In some embodiments, the coating composition may include at least one calcium salt and at least one sulfate salt. For example, calcium ion ($Ca^{2+}$ cation) in the calcium salt may react with sulfate ion ($SO_4^{2-}$ anion) in the sulfate salt to generate ammonium sulfate. In a further embodiment, ammonium sulfate and calcium nitrate may react with each other to generate calcium sulfate dihydrate and ammonium nitrate. Ammonium sulfate as a coating on the fertilizers inhibits spontaneous combustion, for example during storage. Embodiments may also include combination of a calcium and a phosphate. Binders, minerals, nutrients and other components may also be added to a mixture to further a particular goal of a final product.

In some embodiments, the coating materials of the coating composition may be provided at different concentrations to generate the reactive layer coating with varying thickness. A reaction time for formation of the coating and granulation may vary based on the desired coating thickness and materials used. In some embodiments, the reaction time for formation of the coating and granulation may range from about five minutes to about twenty minutes.

Exemplary coating composition components are provided in Table 1 below.

TABLE 1

| Salt |
| --- |
| Ammonium Sulfate |
| Potassium Sulfate |
| Potassium Magnesium Sulfate |
| Phosphate Salts |
| Magnesium Sulfate |
| Calcium Nitrate |
| Calcium Ammonium Nitrate |

The present invention is suitable for coating organic material with an inorganic coating in various thicknesses, depending upon, amongst other considerations, an intended use of the material; the organic material being coated, and the inorganic coating. Accordingly, in some embodiments, by way of non-limiting example, an effective inorganic coating composition coating an organic material may be between about 3% to 15% of the total weight of the finished product; and in additional embodiments, may include between about 15% and 50% of the total weight of the finished product, depending on the desired deployment of the composite material and formulation utilized.

In various embodiments, by way of non-limiting example, an inorganic coating composition may contain between about 6% to 15% nitrogen by weight, 1-15% calcium by weight, 1-15% potassium by weight, and 1-15% sulfur by weight.

In some embodiments, one or both of calcium sulfate dihydrate and ammonium sulfate may be formed in situ. In situ formation may be accomplished, for example, via a chemical reaction between a calcium salt and a sulfate salt in the coating composition. The substrate material may therefore be coated with a layer comprising ammonium sulfate. An exemplary chemical reaction that can generate an inorganic coating is illustrated by Equation 1:

[Equation 1]

In some embodiments, the coating may be provided on a homogenous organic-based fertilizer used for plant nutrition and soil fertility. The organic-based fertilizer may be produced by applying concentrated liquid(s) and/or dry formulation(s) comprising a mixture of one or more plant nutrient(s), one or more additional organic compound(s), one or more penetrate(s), and one or more optional supplement(s) into one or more organic base material(s). The organic base materials include, but not limited to, biosolids, activated sludge, municipal compost, sewage waste, animal manures (e.g., horse, cow, chicken, pig, sheep etc.), and composted organic byproducts.

In an exemplary embodiment, the organic-based fertilizer may include one or more of: humic substances, sludge, water treatment plant solids, manure and peat moss. In another embodiment, the coating may be provided on a fertilizer product as described in U.S. Pat. No. 6,852,142 (hereinafter referred to as the '142 patent), which is incorporated herein by reference in its entirety.

In some embodiments, the coating material may be in form of a liquid coating formulation or composition that may be sprayed on palletized or granulated organic base materials. Alternatively, the coating material can be added via direct mixture into the organic base material prior to granulation.

Mixing equipment are typically used to mix various organic or inorganic materials. The mixing equipment include, but are not limited to, rotating mixers, other rotating containers, rotary drum granulators, pan granulators or disc granulators. The liquid coating composition may be sprayed on organic materials a tone or more of: as the organic materials enter a mixing equipment; as the organic materials are in the mixing equipment; and as the organic materials exit the mixing equipment. In various embodiments, the liquid coating composition can be added by spraying, injecting or otherwise incorporating it into an organic material after granulation, or while the organic material is being rotated or mixed in a rotating blender/mixer or other apparatus.

The liquid coating composition may be sprayed using liquid dispenser nozzles. The liquid coating composition may be added uniformly to allow for uniform coating on the organic material. In some embodiments, the addition of the liquid coating composition may be performed incrementally. The amount added during each increment may depend on the amount of organic material and a desired thickness of the coating.

In some embodiments, a drying process may be executed to dry the coating composition applied on the organic material. The coating composition may be dried at a temperature of between about 85° C. to 105° C. The coated organic material may be dried in a drying apparatus. In some embodiments, a dry coating formulation or composition may be applied to wet organic base materials prior to the drying and granulation process. The dry coating formulation reacts with the wet organic base materials and are mixed through the process of granulation.

In some embodiments, the coating composition may include additional nutrient materials and/or minerals for producing specialty fertilizers. The minerals may provide desirable handling characteristics. In some embodiments, a fertilizer product coated with any of the coating compositions of the present disclosure may be blended with other fertilizers.

Referring now to FIG. 1 method steps are illustrated that may be implemented in a method 100 for producing or manufacturing a coated organic material, in accordance with an aspect of the present disclosure. At step 101 an organic material is placed in a mixer. In some embodiments, a liquid concentrate may be mixed with a biosolid to produce an organic material. The organic material may be the high quality homogenous slow release organic-based fertilizer, as disclosed by the '142 patent. Exemplary compositions of the liquid concentrate and the biosolid can be found in the disclosure of the '142 patent.

At step 102, the organic material is mixed with components suitable for forming an inorganic coating. Suitable materials are discussed herein.

At step 103 in some embodiments, additional components may also be placed in the mixture. The additional components may include, by way of non-limiting example, nitrogen, nutrients, potassium sulfate and/or other additives.

In some embodiments, an optional drying process may be carried out on the organic material. Details of such a drying process are also disclosed by the '142 patent.

At step 104, the organic material is coated to form an encapsulated organic material. As discussed herein, coating may be accomplished via mixing or spraying organic material with components of the coating. In some embodiments, the coating may form in situ based upon interactions between components of the coating. The coating may take place for example in a mixer or based upon the organic material being sprayed with the coating components.

At step 105, the organic material coated with a coating of inorganic material may be combined with value add components and/or fertilizer, such as plant nutrients and nitrogen.

At step 106, the encapsulated coated material may be stored with a diminished propensity or risk of combustion. Diminished propensity and/or risk of combustion allows for storage of the organic material in larger contiguous volumes. In addition, at step 107, the coated organic material may provide improved handling of the organic material. Improved handling may include reduced caking, easier pouring and improved ability to consistently measure the organic material with an inorganic coating.

Though the method 100 is disclosed with reference to the organic-based fertilizer of the '142 patent, one of ordinary skill in the art recognize the methods the present disclosure can be applied to any other organic-based fertilizer material. The organic-based fertilizer material includes, but not limited to, biosolids, activated sludge, municipal compost, sewage waste, animal manures (e.g., horse, cow, chicken, pig, sheep etc.), and composted organic byproducts.

At step 104, the organic material is granulated in a granulating equipment. The granulating equipment may be a rotary drum granulator, a disc granulator or a pan granulator. The granulation process may generate granules or pellets of the organic material.

At step 106, a coating composition may be applied on the organic material. In some embodiments, the organic material may be granulated and coated simultaneously. However, in alternative embodiments, the coating composition may be applied prior to or after the granulation process.

The coating composition may comprise of ammonium sulfate, potassium sulfate, potassium magnesium sulfate, potassium chloride, magnesium sulfate, calcium nitrate and/or calcium ammonium nitrate. In some embodiments, the coating may be a reactive mineral layer coating. In another embodiment, the coating composition may include at least one calcium salt and at least one sulfate salt. For example, calcium ion ($Ca^{2+}$ cation) in the calcium salt may react with sulfate ion ($SO_4^{2-}$ anion) in the sulfate salts to generate calcium sulfate, which may be used as an inorganic coating in some embodiments of the present invention. In a further embodiment, ammonium sulfate and calcium nitrate may react with each other to generate calcium sulfate dihydrate and ammonium nitrate. In some embodiments, the coating materials of the coating composition may be provided at different concentrations to generate the reactive layer coating with varying thickness.

In some embodiments, the coating composition may be a liquid formulation that is sprayed on the organic material via one or more liquid dispenser nozzles. In alternative embodiments, the coating composition may be a dry formulation that is mixed with the organic material during the granulation process. In still other embodiments, the coating composition may be a slurry, or any mixture of solid particles and one or more liquids.

The coating composition may be prepared by various methods depending on the type of coating composition. In some embodiments, the coating composition may be prepared by dissolving one or more inorganic salts in a solvent to produce a coating solution. In another embodiment, the coating composition may be prepared by mixing solid particles of two or more inorganic salts. In yet another embodiment, the coating composition may be prepared by suspending solid particles in a liquid to produce a slurry.

In some embodiments, the coating composition may be a reactive mineral coating that generates calcium sulfate dihydrate by one or more chemical reaction(s). In other embodiments, the coating composition includes at least one calcium salt and at least one sulfate salt that chemically react with each other to generate ammonium sulfate. In an exemplary embodiment, ammonium sulfate and calcium nitrate react to generate calcium sulfate dihydrate ($CaSO_4.2H_2O$) and ammonium nitrate. In still other embodiments, the coating composition can include ammonium sulfate, calcium nitrate, potassium sulfate, potassium magnesium sulfate, potassium chloride, magnesium sulfate and calcium ammonium nitrate.

The time duration of the coating process, reaction time for formation of the coating and/or the time duration of the granulation process may be selected appropriately based on a desired thickness of the coating and the materials used. In some embodiments, the reaction time for formation of the coating and granulation may range from about five minutes to about twenty minutes.

After coating and the granulation, the organic material, that includes an outer coating of an inorganic material, may be subjected to an optional drying process. The drying process may cease any further chemical reaction in the coating. The drying process may also dry the coating and/or the organic material to provide a fertilizer product. The method 100 therefore provides the fertilizer product having an outer inorganic coating including ammonium sulfate.

Figure 2:
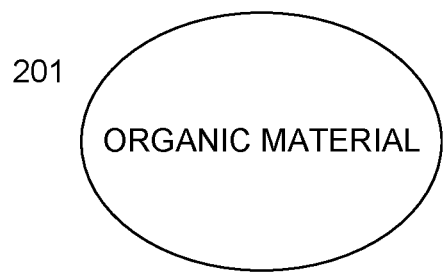
FIG. 2 illustrates a fertilizer product.
Figure 2:
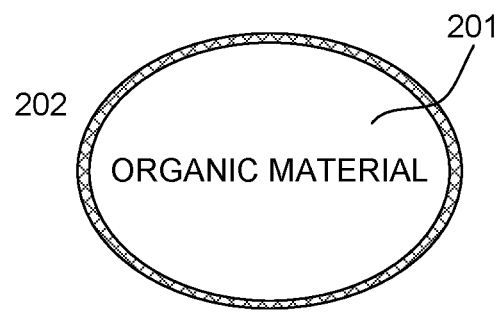
Figure 2:
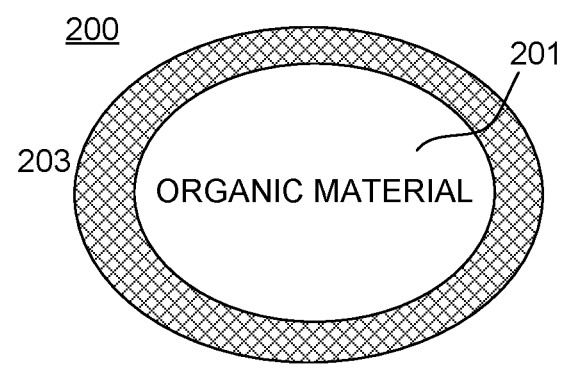

FIG. 2 illustrates an organic material 200 such as a fertilizer product as it is being formed according to some embodiments of the present disclosure. The organic material 200 may be a fertilizer pellet or granule. Essentially organic material 200 may have any shape within the scope of the present disclosure, it is illustrated in a generally naturally occurring ovoid shape, but other shapes are within the scope of the present invention. Shapes may therefore include, for example, cylindrical pellets, a sphere, cubes, or other naturally occurring to manufactured shape.

As illustrated in FIG. 2, the organic material 200 includes a core 201 made of an organic material and an outer coating 203 made of an inorganic material. The outer coating 202-203 may completely or partially enclose the core 201. Further, the outer coating 202-203 may have one or more layers. In some embodiments, the inorganic material includes, for example, one or more of: calcium sulfate dihydrate, ammonium sulfate, and calcium phosphate. In some embodiments, the organic material 200 may be produced using the method 100, as described above with reference to FIG. 1.

As illustrated, a coating 202-203 may be formed first as a thinner coating 202 and continue to add coating material to form a thicker, final outer coating 203.

The final outer coating 203 may have a uniform thickness or a varying thickness. In some embodiments, the final outer coating 203 may have a thickness between 10 microns and 100 microns.

In some embodiments, an inorganic coating, such as ammonium sulfate, may comprise 10% to 25% of the total weight of the outer coating 203. Further, the inorganic coating, such as ammonium sulfate, may comprise 1% to 15% of the total weight of a resulting organic material 200.

The organic material 200 with the outer coating 203 may resist auto-combustion and provide more favorable handling conditions. The outer coating 203 may also provide the organic material 200 with increased nitrogen content. In some embodiments, the organic material 200 may have increased nutrient content and uptake efficiency. The organic material 200 may also have reduced odor associated with organic materials.

Further, depending on the compositions of the core 202 and the outer coating 203, the organic material 201 have different ratios of Nitrogen (N), Potassium (P), and Potassium (K). The organic material 201 may also include any additional macros or micro nutrients that may contain controlled release or quick release components.

In some embodiments, the organic material 200 may contain (by weight) up to 15% nitrogen; up to 10% phosphorus; up to 10% potassium; up to 10% calcium; up to 5% magnesium; up to 5% iron; up to 0.05% zinc; up to 0.5% manganese; up to 0.05% copper; and up to 0.01% boron.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. A method of preparing a fertilizer composition comprising:
   contacting an organic material, the organic material selected from the group consisting of biosolids, activated sludge, municipal compost, sewage waste, animal manures, horse manure, cow manure, chicken manure, pig manure, sheep manure, composted organic byproducts, humic substances, sludge, water treatment plant solids, manure, and peat moss,
   with a calcium salt, a sulfate salt, and water, the calcium salt selected from the group consisting of calcium nitrate, calcium ammonium nitrate, and calcium phosphate, the sulfate salt selected from the group consisting of ammonium sulfate, potassium sulfate, potassium magnesium sulfate, and magnesium sulfate;
   and mixing, wherein in said contacting and mixing, calcium ion from the calcium salt and sulfate ion from the sulfate salt react, to produce, on said organic material, a coating comprising one or both of calcium sulfate dihydrate and calcium sulfate and one or both of ammonium nitrate and ammonium sulfate;
   and drying;
   to prepare the fertilizer composition.

2. The method according to claim 1, further comprising a step of granulating the organic material in a granulating equipment.

3. The method according to claim 2, wherein the granulating equipment comprises one of a rotary drum granulator and a disc granulator.

4. The method according to claim 1, wherein the contacting further comprises a step of spraying a solution of calcium salt on the organic material.

5. The method according to claim 1, wherein the contacting and mixing further comprises contacting and mixing the organic material with potassium chloride.

6. The method according to claim 1, wherein the coating comprises calcium sulfate dihydrate, ammonium nitrate, and ammonium sulfate.

7. The method according to claim 1, wherein the coating comprises calcium sulfate dihydrate and ammonium sulfate.

8. The method according to claim 1, wherein the coating comprises calcium sulfate dihydrate, ammonium sulfate, and calcium phosphate.

9. The method according to claim 1, wherein the coating comprises calcium sulfate.

10. The method according to claim 1, wherein the coating comprises ammonium sulfate.

* * * * *